United States Patent [19]

Krofchak

[11] Patent Number: 5,968,258
[45] Date of Patent: Oct. 19, 1999

[54] METHOD OF MAKING CEMENT FROM BASE METAL SMELTER SLAG

[75] Inventor: David Krofchak, Copper Cliff, Canada

[73] Assignee: Fenicem Minerals Inc., Copper Cliff, Canada

[21] Appl. No.: 09/074,794

[22] Filed: May 8, 1998

Related U.S. Application Data

[63] Continuation-in-part of application No. 08/756,861, Nov. 26, 1996, Pat. No. 5,749,962, which is a continuation-in-part of application No. 08/494,665, Jun. 26, 1995, Pat. No. 5,593,493.

[51] Int. Cl.$^6$ .......................... C04B 7/147; C04B 7/153; C04B 7/19
[52] U.S. Cl. .......................... 106/782; 106/776; 106/784; 106/789; 106/791; 106/816
[58] Field of Search .................... 106/776, 782, 106/784, 789, 816, 791

[56] References Cited

U.S. PATENT DOCUMENTS

| 4,904,503 | 2/1990 | Hilton et al. | 106/785 |
| 5,593,493 | 1/1997 | Krofchak | 106/789 |
| 5,749,962 | 5/1998 | Krofchak | 106/789 |

*Primary Examiner*—Michael Marcheschi
*Attorney, Agent, or Firm*—Rodgers & Scott

[57] ABSTRACT

A method of making cement from base metal smelter slag produced by a nickel, copper, lead or zinc smelter, includes crushing the slag with a source of calcium sulphate to a size of less than about ¼ inch and heating the mixture to produce a cement, and grinding the cement to a size in the range of from about −250 to about 425 mesh.

2 Claims, No Drawings

METHOD OF MAKING CEMENT FROM BASE METAL SMELTER SLAG

This application is a continuation-in-part of application Ser. No. 08/756,861 filed Nov. 26, 1996, now U.S. Pat. No. 5,749,962 issued May 12, 1998, which is a continuation-in-part of application Ser. No. 494,665 filed Jun. 26, 1995, now U.S. Pat. No. 5,593,493 issued Jan. 14, 1997.

FIELD OF THE INVENTION

This invention relates to the making of cement from base metal (copper and nickel, lead or zinc smelter slag) to produce a cement which can be used in making concrete or as a binder for solidifying waste materials such as mine tailings.

Base metal smelter slag typically contains by weight from about 15 to about 40% silica ($SiO_2$) from about 35 to about 60% iron oxide ($Fe_2O_3$) from about 2 to about 20% (CaO) from about 1 to about 5% of various other compounds such as MgO, Na2O, K2O, and trace amounts of metals such as nickel, copper, lead, zinc and cobalt.

BACKGROUND OF THE INVENTION

In Canada, the recovery of copper, nickel, lead and zinc from their ores produces over twelve million tons of slag per year. Since about 1900, some slags have been used for rail ballast, but usually large slag heaps have accumulated near the smelters. In recent years, at various mines in Europe and Australia, some smelter slags (usually copper smelter slags) have been ground to about −250 mesh and mixed with regular portland cement to produce a blended cement for use in cemented mine backfill.

During the 1980's the pozzolanic (i.e. cementing) properties of Canadian smelter slags were studied to evaluate the feasibility of their use as a partial replacement for regular portland cement and mine backfill. It was concluded that these slags could be so used. However, the results were much inferior to those obtained with regular portland cement. For example, steel blast furnace slag mixtures only provided approximately 70% of the strength obtained by use of regular portland cement or regular portland cement/steel blast furnace slag mixtures. Consequently the work was discontinued, it also having been found that the economics, including transportation costs, were not favourable.

It has recently been found that large slap heaps are leaching unacceptably high amounts of heavy metal values, and mining companies are seeking acceptable solutions to this ground problem. Also, environmental authorities are requiring that plans be formulated for long term permanent solutions.

It is therefore an object of this invention to provide a method of using base metals smelter slag to produce a cement for general construction purposes, including mine backfill, whose properties will be equal to or better than those of regular portland cement or regular portland cement/blast furnace slag mixtures.

SUMMARY OF THE INVENTION

According to the invention a method of making cement from slag produced by a nickel, copper, lead or zinc smelter includes crushing the slag and a source of calcium sulphate to a size of less than about 0.25 inches, heating the mixture to produce a cement, and grinding the cement to a size in the range of from about −250 to about 425 mesh. The resultant cement can be used by itself or, depending on the desirable strength, blended with other cements, with sand, stone and water being added to produce concrete.

Such utilization of base metal smelter slags to produce a cement can substantially completely solve the environmental leach problem of heavy metals, while at the same time providing a viable and practical use for the slag. It is known that tying up heavy metals as metallic silicates renders them substantially totally insoluble in water and thereby non-leachable. With the present invention, this is automatically accomplished while simultaneously making concrete.

Sulfuric acid can be obtained as a bi-product according to the following reaction:

$CaSO_4 + SiO_2 \rightarrow CaO.SiO_2 + SO_3$

Recovered to produce $H_2SO_4$

The reaction can also be shown in the following manner:

$2CaSO_4 + SiO_2 \rightarrow 2CaO.SiO_2 + 2SO_3$ $3CaSO_4 + SiO_2 \rightarrow 3CaO.SiO_2 + 3SO_3$ In the presence of water, the calcium silicates (dicalcium silicate $2CaO.SiO_2$ and tricalcium silicate, $3CaO.SiO_2$, known also as belite and alite, respectively) hydrate to form calcium hydroxide and tobermorite gel, which are compounds which form the infrastructure of hardened cement.

Any source of gypsum can be used, for example anhydrit, plaster of Paris, wall board etc. Also, any source of calcium oxide can be used, for example lime, limestone, calcium carbonate, etc. Silica may also be added.

The sulfuric acid obtained may be used to produce a reagent which can be used in the solidification of tailings for mine backfill.

Various examples of the invention will now be described.

EXAMPLE 1

100 g of base metal slag (BMS) were mixed with 105 g of gypsum and put in a crucible and heated in a propane furnace. After heating, the charge was screened to −325 mesh, and 30 g were mixed with water. The charge set and hardened. The pH was between 10 and 11.

The following table 1 shows the chemical analysis of BMS compared to the new cementitius material and to normal Portland cement (NPC).

TABLE 1

| | PERCENTAGE BY WEIGHT | | |
|---|---|---|---|
| | NPC | BMS | NEW SLAG |
| CaO | 62 | 2.7 | 23 |
| $Al_2O_3$ | 5 | 5.8 | 3 |
| $SiO_2$ | 20 | 36 | 21 |
| $Fe_2O_3$ | 2 | 53 | 35.8 |
| MgO | 2.5 | 2.4 | 1.5 |
| $SO_3$ | 3.8 | 2.2 | 12.5 |

The new slag clearly has improved cementitius properties compared to base metal slag, the composition of the new slag being closer to that of NPC.

EXAMPLE 2

100 g of base metal slag was mixed with 25 g of CaO and 90 g of gypsum, put in a crucible and heated in a propane furnace. The addition of CaO was to improve the line content in the new slag. The chemical analysis of the new slag compared to BMS and NPC is shown in the following Table II

TABLE II

| | PERCENTAGE BY WEIGHT | | |
|---|---|---|---|
| | NPC | BMS | NEW SLAG |
| CaO | 62 | 2.7 | 30 |
| $Al_2O_3$ | 5 | 5.8 | 2.4 |
| $SiO_2$ | 20 | 36 | 17 |
| $Fe_2O_3$ | 2 | 53 | 28.6 |
| MgO | 2.5 | 2.4 | 1.3 |
| $SO_3$ | 3.8 | 2.2 | 20 |

The new slag (cement) has a higher amount of CaO than the new slag in example 1. When water was added it set faster, and became stronger from a compressive point of view. In both examples, the amount of $SO_3$ is higher than in NPC. The amount can be reduced by adding silica in order to have excess gypsum react to form calcium silicate (dicalcium silicate or tricalcium silicate).

The method of the present invention has advantageously made use of smelter slag to make cement for use in concrete and mine backfill operations, while solving a growing and perplexing environmental problem. Thus, an economical and viable solution has been invented for recycling a waste material into a cement.

Other embodiments and examples of the invention will be readily apparent to a person skilled in the art. The scope of the invention being defined in the appended claims.

I claim:

1. A method of making cement from base metal smelter slag produced by a nickel, copper, lead or zinc smelter, said slag containing (by wt.) from about 40% silica ($SiO_2$), from about 35 to about 60% iron oxide ($Fe_2O_3$) and from about 2 to about 20% calcium oxide (CaO), said method including:

crushing the slag with a source of calcium sulphate to a size of less than about 0.25 inches, heating the mixture to produce a cement, and grinding the cement to a size in the range of from about −250 to about 425 mesh.

2. A method according to claim 1 wherein a further source of calcium oxide is also crushed with the slag and the source of calcium sulphate and heated to produce a cement.

* * * * *